Figure 1:
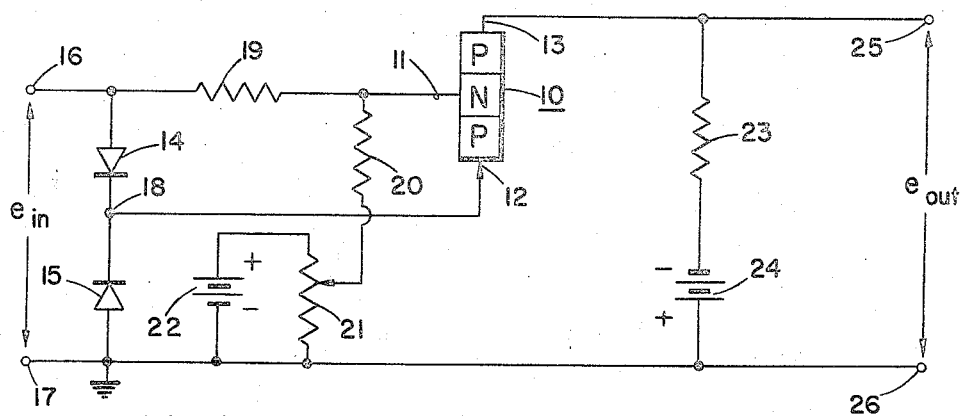

Sept. 9, 1958  R. C. WITTENBERG ET AL  2,851,638
VOLTAGE MAGNITUDE COMPARISON CIRCUIT
Filed July 3, 1957

INVENTORS
ROLAND C. WITTENBERG
HAROLD SANDLER
BY
B. F. Spencer
AGENT

United States Patent Office 2,851,638
Patented Sept. 9, 1958

2,851,638

VOLTAGE MAGNITUDE COMPARISON CIRCUIT

Roland C. Wittenberg, New Hyde Park, and Harold Sandler, Whitestone, N. Y., assignors to Reeves Instrument Corporation, Garden City, N. Y., a corporation of New York Application July 3, 1957, Serial No. 669,754

13 Claims. (Cl. 315—135)

This invention relates to transistor circuits, and in particular to apparatus for comparing the magnitude of an applied input voltage with a reference voltage having a predetermined magnitude.

The need frequently arises for an electronic amplifier circuit which is responsive to the magnitude of an applied input voltage without regard to the polarity of the applied voltage. Such an amplifier circuit is useful in combination with a voltage indicator to indicate that the absolute magnitude of a given voltage has exceeded a predetermined voltage level. Such a circuit combination also may be employed to compare the absolute magnitude of a first voltage with the magnitude of a second voltage and to indicate whether the first voltage is greater or less than the second voltage.

In the programming of an electronic analog computer, it is important that the circuit constants be selected so that the signal voltages at the input of each computing amplifier will be of sufficient magnitude to insure that each amplifier operates with the requisite signal-to-noise ratio. It is not always feasible, however, to determine in advance of computer operation whether or not a given amplifier will receive a signal voltage whose magnitude is sufficiently in excess of the noise level of the amplifier to assure accurate computation. Therefore, it would be desirable to provide each computing amplifier with a device for indicating that the signal voltage at its input terminals has attained or exceeded that magnitude sufficient for satisfactory amplifier performance. Of necessity, the indicating or monitoring device must respond to either positive or negative voltages, should not unduly load the circuit being monitored, and should possess small size and low power consumption.

Accordingly, the principal object of the invention is to provide an improved voltage magnitude comparison circuit.

Another object is to provide a circuit arrangement for indicating when an applied voltage has exceeded a predetermined magnitude regardless of the polarity of the applied voltage.

Still another object is to provide a simple and reliable device for indicating whether the absolute magnitude of an applied first voltage is less than or greater than the magnitude of a second voltage.

Yet another object is to provide a voltage comparison circuit responsive only to the first excursion of an applied voltage above a predetermined value and thereafter be unaffected by changes in the applied voltage.

A further object is to provide a simple and reliable amplifier circuit responsive only to the magnitude of an applied voltage.

In accordance with the present invention there is introduced an improved voltage comparison circuit employing a transistor amplifier in conjunction with a glow-discharge tube indicator for achieving the above objects. In one embodiment of the invention the input voltage is applied across a pair of series-connected oppositely-polarized diodes. The emitter electrode of the transistor is coupled to the common junction and the base electrode is coupled through a resistor to one of the end terminals of the series-coupled diodes. An output circuit including a series-coupled load impedance and a source of potential is coupled from the collector electrode of the transistor to the other end terminal of the series-coupled diodes. A reference voltage source is coupled in series with a resistor between the base electrode of the transistor and the other end terminal of the series-coupled diodes. The glow-discharge tube is coupled in series with a second source of potential, and the series circuit is coupled across the output circuit. The polarity of the voltage existing between the base electrode and the emitter electrodes determines whether or not the transistor will conduct current. The polarity of this voltage is dependent upon the ratio of the magnitude of the applied input voltage to the magnitude of the reference voltage source and is independent of the polarity of the input voltage.

The improved voltage comparison circuit is further provided with a clamping circuit consisting of an additional source of potential, a diode, and a switch arranged as a series-coupled circuit. This series-coupled clamping circuit is coupled in parallel with the output circuit of the transistor.

Figure 2:
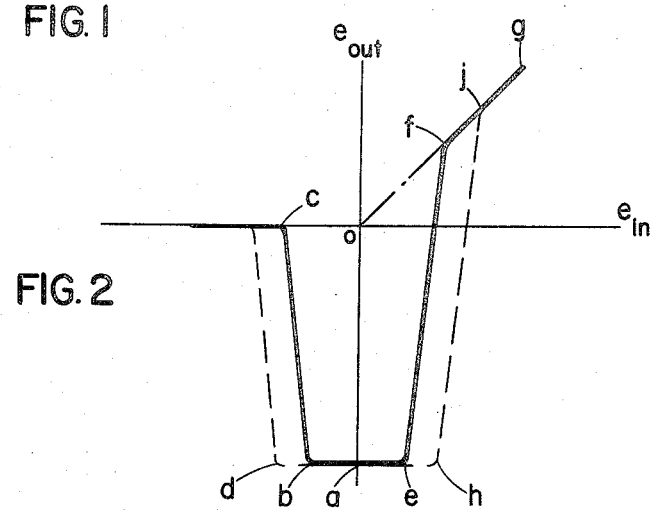
Figure 3:
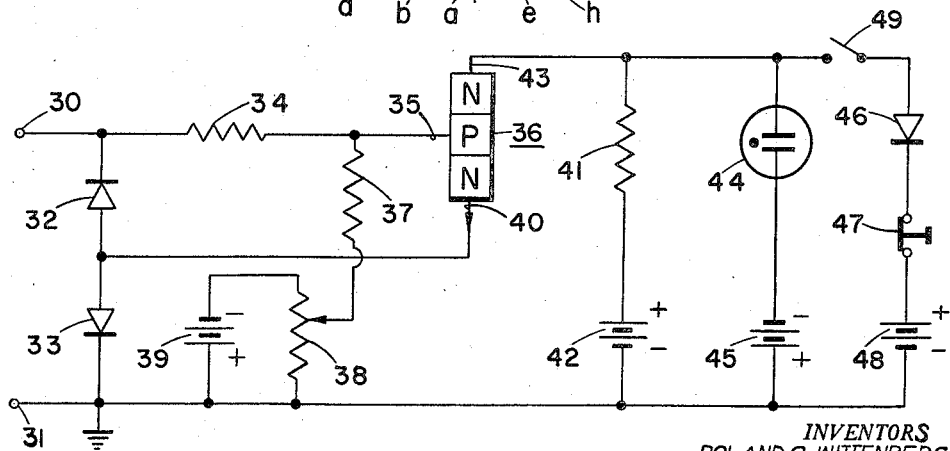

The above objects of and the brief introduction to the present invention will be more fully understood and further objects and advantages will become apparent from a study of the following detailed description in connection with the drawing, wherein:

Fig. 1 illustrates a schematic diagram of one embodiment of the improved voltage magnitude comparison circuit in accordance with the invention, Fig. 2 is a graph of the input-output voltage characteristic of the circuit of Fig. 1, and Fig. 3 illustrates the schematic diagram of the indicator circuit coupled to another embodiment of the comparison circuit of Fig. 1.

Referring to Fig. 1, there is shown a type P–N–P transistor 10 having a base electrode 11, emitter electrode 12, and a collector electrode 13. A pair of diodes 14 and 15 are connected in series between input terminals 16 and 17. Diode 14 is polarized for forward conduction of current from input terminal 16 to junction 18, and diode 15 is polarized such that current will flow in the forward direction when the junction 18 is negative with respect to terminal 17. The terminal 17 is coupled to ground. The base electrode 11 is coupled through input resistor 19 to the input terminal 16, and is also coupled through biasing resistor 20 to the arm of potentiometer 21. Potentiometer 21 is coupled across a direct voltage source 22 having its negative terminal grounded. The emitter electrode 12 is coupled directly to the junction 18 of diodes 14 and 15. The output circuit consisting of load resistor 23 in series with direct voltage source 24 is coupled between the collector electrode 13 and ground. The output voltage is produced across output terminals 25 and 26, terminal 25 being connected to collector 13 and terminal 26 being grounded.

The voltage existing between the transistor base 11 and ground is determined by the magnitude and polarity of the input voltage, the magnitude of reference voltage source 22, the setting of the arm of potentiometer 21, and the values of resistors 19 and 20. The voltage between the emitter 12 and ground depends only upon the magnitude and polarity of the input voltage. The P–N–P transistor 10 conducts when the magnitude of the input voltage is sufficiently large to make the potential of base 11 negative with respect to emitter 12.

When the polarity of the applied input voltage on terminal 16 is negative with respect to ground, diode 14 will not conduct. Diode 15 maintains the emitter 12 substantially at ground potential. With the value of resistor 19 equal to the value of resistor 20, a negative potential will exist at the base 11 with respect to ground only when the magnitude of the negative input voltage exceeds the magnitude of the positive potential between the arm of potentiometer 21 and ground. When the magnitude of the negative input voltage is less than the magnitude of the positive voltage at the arm of potentiometer 21, transistor 10 will not conduct and the voltage between the output terminals 25 and 26 will be substantially equal to the voltage of source 24.

When the polarity of the applied input voltage on terminal 16 is positive with respect to ground, diode 14 will conduct and diode 15 will be non-conductive. Thus, the potential between emitter 12 and ground is substantially the same as between the input terminal 16 and ground. The magnitude of the voltage from base 11 to ground is determined by the relative magnitudes of the applied input voltage and the positive voltage at the arm of potentiometer 21. When the magnitude of the positive applied voltage equals the magnitude of the positive voltage from the arm of potentiometer 21 to ground the magnitude of the voltage from base to ground will be substantially the same as from emitter 12 to ground. Thus, no potential difference will exist between the base 11 and emitter 12. However, if the magnitude of the positive applied voltage is greater than the magnitude of the positive voltage at the arm of potentiometer 21, the magnitude of the positive voltage from base 11 to ground will be less than the magnitude of the positive voltage from emitter 12 to ground. This results in a negative voltage existing between base 11 and emitter 12, and the transistor 10 will conduct current. If the magnitude of the positive applied voltage is less than the magnitude of the voltage at the arm of potentiometer 21, transistor 10 will not conduct, and the output voltage at terminal 25 will be substantially equal to the voltage of source 24.

The graph of Fig. 2 further illustrates the operation of the improved comparison circuit of Fig. 1 by showing its input-output voltage characteristics. Regardless of the polarity of the applied input voltage $e_{in}$, when its magnitude is less than the magnitude of the voltage at the arm of potentiometer 21, the output voltage $e_{out}$ is substantially equal to the negative voltage source 24, as illustrated by the line portion "b—a—e."

When the applied input voltage is negative and its magnitude is slightly greater than the magnitude of the voltage at the arm of potenometer 21, transistor 10 will begin to conduct current as indicated by the point "b" of Fig. 2. As the magnitude of the applied negative input voltage increases, the current flowing through the transistor 10 and diode 15 increases. The increase in transistor current causes the magnitude of the negative voltage appearing between output terminal 25 and ground to decrease. The value of load resistor 23 is selected to have a resistance value very much larger than the resistance of transistor 10 while its conducts current. Thus, as the transistor current increases, the magnitude of the output voltage across terminals 25, 26 reduces abruptly and becomes substantially zero as represented by the point "c." Since the output voltage at terminal 25 is the collector voltage, a further increase in the magnitude of the applied negative voltage does not cause any further increase in collector current. The transistor is, therefore, saturated and the output voltage remains substantially zero for further increases in the magnitude of the applied negative voltage.

If the magnitude of the positive reference voltage at the arm of potentiometer 21 is increased, transistor 10 will not begin to conduct until the magnitude of the applied negative input voltage exceeds the magnitude of the reference voltage. This condition is illustrated at point "d." Conversely, if the magnitude of the reference voltage is reduced, transistor 10 will begin to conduct for a smaller applied voltage.

When the applied input voltage is positive and its magnitude is slightly greater than the magnitude of the voltage at the arm of potentiometer 21, transistor 10 will begin to conduct current as indicated by the point "e." As the magnitude of the applied positive input voltage increases, the current flowing through the transistor 10 increases. This current does not flow through diode 15, however, but flows through diode 14 and through the input voltage source. The increase in transistor current causes the magnitude of the negative voltage appearing across the output terminals to decrease until it reaches zero, and then to increase in the positive direction until it reaches a potential represented by the point "f." A positive output voltage exists across the output terminals because the resistance of diode 14 and transistor 10 while conducting current is very much less than the value of load resistor 23. Thus, a low resistance path exists between the input terminal 16 and the output terminal 25. The magnitude of the output voltage $e_{out}$ continues to increase in a positive direction along the line "f—g" with further increases in the magnitude of the positive applied input voltage. The output voltage $e_{out}$ is substantially equal to the input voltage $e_{in}$ when transistor 10 is fully conducting, and the slope of the line "o—f—g" is substantially unity.

If the magnitude of the positive reference voltage at the arm of potentiometer 21 is increased, transistor 10 will not begin to conduct until the magnitude of the applied positive voltage exceeds the magnitude of the reference voltage. For this condition, the output voltage $e_{out}$ will vary, for example, along the line "a—h—j—g" as the magnitude of the positive input voltage increases. Conversely, if the magnitude of the positive reference voltage is reduced, transistor 10 will begin to conduct for smaller applied positive input voltages.

Fig. 3 illustrates another embodiment of the comparison circuit of Fig. 1 together with a visual indicator for indicating when an applied voltage exceeds a predetermined magnitude. The comparison circuit of Fig. 3 employs a N–P–N transistor 36, instead of a P–N–P transistor, and is the complement of the circuit of Fig. 1. A pair of series-connected, oppositely-polarized diodes 32 and 33 are coupled between input terminals 30 and 31 in the same general manner as in Fig. 1. However, the diodes 32 and 33 are polarized oppositely to those of Fig. 1, and current will flow from the junction of the diodes toward one or the other input terminals. Resistor 34 couples base 35 to input terminal 30, and resistor 37, which may be equal to resistor 34, couples base 35 to the arm of potentiometer 38. Input terminal 31 is coupled to ground. Reference voltage source 39, having its positive terminal grounded, is coupled across potentiometer 38. Emitter 40 is directly coupled to the junction of the diodes. Load resistor 41 and positive voltage source 42 are coupled in series between collector 43 and ground.

A neon glow-discharge tube 44 and negative voltage source 45 are coupled in series between collector 43 and ground. The neon indicator is provided with a clamping circuit including a disconnect switch 49, a clamping diode 46, a normally closed reset switch 47, and a positive voltage source 48 coupled in series between collector 43 and ground.

In the absence of an applied voltage across input terminals 30—31 and with disconnect switch 49 open, no current will flow through transistor 36. The sum of the two voltages produced by sources 42 and 45 is selected to have a value sufficient to cause neon tube 44 to ionize or ignite, thereby providing a visual indication representing no current flow through the transistor. With no current flowing through transistor 36, the positive voltage between collector 43 and ground is equal to the potential of source 42 less the voltage drop across load resistor 41 caused by current flow through neon tube 44.

With a positive voltage existing between collector and emitter, the N–P–N transistor 36 conducts when the potential of its base is positive with respect to its emitter. Due to the presence of a negative reference voltage at the arm of potentiometer 38, the base to emitter potential will not become positive until the magnitude of an applied voltage exceeds the magnitude of the reference voltage. Regardless of the polarity of an applied input voltage, when its magnitude exceeds that of the reference voltage at the arm of potentiometer 38, the potential from base to emitter is positive and transistor 36 conducts in the same general manner as described in connection with Fig. 1.

Current flow through transistor 36 increases the voltage drop across load resistor 41. This increase in current causes a reduction in the positive potential existing between collector 43 and ground, and accordingly, a reduction in the potential across neon tube 44. When the collector to ground potential is in the vicinity of zero or is negative, the potential existing across neon tube 44 is insufficient to maintain ionization and the neon tube extinguishes. Expressed differently, an increase in transistor current causes a reduction in the current flowing through neon tube 44 until insufficient current flows in the neon tube to sustain ionization. Since the current flowing through transistor 36 increases abruptly when the potential from base to emitter becomes positive, neon tube 44 provides an accurate indication that the magnitude of the applied input voltage has exceeded the predetermined reference voltage.

In some applications, it is desirable to have the neon tube indicator extinguish at the first excursion of the applied input voltage in excess of a predetermined value and to thereafter remain extinguished. This provides an indication to an operator that the input signal had exceeded that level which represents the predetermined magnitude. The series clamping circuit provides this feature when the disconnect switch 49 is closed. The sum of the potentials of the voltage sources 45 and 48 are selected to have a value just sufficient to maintain ionization of neon tube 44 but less than the value required to ignite the neon tube. Thus, when neon tube 44 is extinguished, it will not again reignite because the series clamping circuit will prevent the positive voltage from collector 43 to ground from exceeding the potential of source 48. As a result, neon tube 44 will remain extinguished until the series-clamping circuit is momentarily opened by manually depressing reset switch 47. Opening the clamping circuit allows the potential across neon tube 44 to rise to that value necessary to cause ignition. Once ignited the reset switch 47 may be released to its normally closed position thereby reconnecting the clamping circuit without extinguishing the neon tube 44.

The glow-discharge tube circuit and series clamping circuit of Fig. 3 may be coupled, if desired, across output terminals 25 and 26 to Fig. 1. It will be necessary, of course, to reverse the polarity of voltage sources 45 and 48 as well as the polarity of diode 46.

The simple and reliable voltage comparison circuit of this invention may be used in a variety of applications, including analog computers, to accurately monitor the levels of varying signal voltages and to indicate that a signal voltage has exceeded a predetermined value. It may also be used to control other devices, and to measure the magnitude of an applied voltage by determining the value of the reference voltage at which the glow-discharge tube extinguishes.

As many changes could be made in the above construction and many different embodiments of this invention could be made without departing from the scope thereof, it is intended that all matter contained in the above description or shown in the accompanying drawing shall be interpreted as illustrative and not in a limiting sense.

What is claimed is:

1. A transistor amplifier circuit comprising in combination, a transistor having an input electrode, an output electrode, and a third electrode, a pair of input terminals for receiving an applied voltage to be amplified, resistor means coupling one of said input terminals to said input electrode, a pair of series-connected oppositely-polarized diodes coupled between said input terminals, means coupling the junction of said series-coupled diodes to said third electrode, bias resistor means and a suorce of bias potential coupled in series between said input electrode and the other of said input terminals, and an output load impedance means and source of potential coupled in series between said output electrode and said other input terminal.

2. The transistor amplifier circuit as defined in claim 1 further comprising means indicating that the magnitude of said applied voltage has exceeded the magnitude of the bias potential, said indicating means including a glow-discharge tube and a source of fixed potential coupled in series between said output electrode and said other input terminal.

3. The transistor amplifier circuit as defined in claim 2 further comprising a clamping circuit for said indicating means, said clamping circuit preventing the re-ignition of said glow-discharge tube after the magnitude of said applied voltage has exceeded the bias potential, said clamping circuit comprising a series circuit including a unidirectional conductive device, a normally closed-circuit switch and a source of fixed potential, said series clamping circuit being coupled between said output electrode and said other input terminal.

4. Apparatus for comparing the magnitude of an applied input voltage with a predetermined reference voltage, comprising in combination, first and second series-connected oppositely-polarized diodes; said applied input voltage being coupled across said series-coupled diodes; a transistor having an input electrode, an output electrode, and a third electrode; an input resistor coupled between said input electrode and one end of said series-connected diodes; means coupling the junction of said series-connected diodes to said third electrode; a biasing resistor having one end connected to said input electrode; means adapted for coupling said predetermined reference voltage between the other end of said biasing resistor and the other end of said series-connected diodes; and output circuit means coupled between said output electrode and said other end of said series-connected diodes.

5. Apparatus for indicating that the magnitude of an input voltage has exceeded a predetermined level comprising first and second series-connected oppositely-polarized diodes; said input voltage being connected across said diodes; a transistor having a base, an emitter, and a collector; an input resistor coupled between said base and one end of said series-connected diodes; biasing means including a resistor and a source of reference voltage connected in series, one end of said biasing means being connected to said base and the other end being connected to the other end of said series-connected diodes; means coupling the junction of said series-connected diodes to said emitter; load circuit means coupled between said collector and said other end of said series-connected diodes; said load circuit means including a source of electrical energy and a resistor coupled in series; and monitoring means coupled across said load circuit means for indicating the state of conduction of said transistor.

6. The apparatus for indicating that the magnitude of an input voltage has exceeded a predetermined level as defined in claim 5 wherein said monitoring means comprises a glow-discharge tube and a source of electrical energy coupled in series.

7. Apparatus for comparing the magnitude of an applied input voltage with a predetermined reference voltage comprising a transistor having a base electrode, a collector electrode, and an emitter electrode; first and second input terminals; means coupling said base electrode to said first input terminal; switching means coupling said emitter electrode to said first input terminal when said applied input voltage is of one polarity and to said second input terminal when said applied input voltage is of reverse polarity; means including a reference voltage source coupled between said base electrode and said second input terminal; and output circuit means coupled between said collector electrode and said second input terminal.

8. Apparatus for comparing the magnitude of an applied input voltage with a predetermined reference voltage as defined in claim 7 wherein said means including said reference voltage source comprises a first impedance element coupled in series with said source, and wherein said means coupling said base electrode to said first input terminal comprises a second impedance element.

9. Apparatus for comparing the magnitude of an applied input voltage with a predetermined reference voltage as defined in claim 7 wherein said switching means comprises a pair of series-connected oppositely-polarized diodes connected across said first and second input terminals, the junction of said series-connected diodes being connected to said emitter electrode.

10. Apparatus for comparing the magnitude of an applied input voltage with a predetermined reference voltage as defined in claim 7 wherein said switching means includes first and second terminals coupled respectively to said first and second input terminals, and includes a third terminal coupled to said emitter electrode.

11. Apparatus for comparing the magnitude of an applied first input voltage with the magnitude of a second voltage comprising a transistor having an input electrode, an output electrode, and a third electrode, a pair of input terminals for receiving said first input voltage, first and second switching means coupled in series between said pair of input terminals, means coupling said third electrode to the junction of said series-coupled switching means, said series-coupled switching means coupling said third electrode to one of said pair of input terminals when said first input voltage is of one polarity and to the other of said pair of input terminals when said first input voltage is of reverse polarity, resistor means coupling said input electrode to said one input terminal, a load impedance element and a source of potential coupled in series between said output electrode and said other input terminal, and means including a resistor for coupling said second voltage between said input electrode and said other input terminal.

12. Voltage indicating apparatus comprising in combination, a glow-discharge tube having a pair of terminals; a clamping circuit coupled across said glow-discharge tube; said clamping circuit comprising a series circuit including a uni-directional conductive device and a source of fixed potential; the magnitude of said source of fixed potential being less than the ignition potential of said glow-discharge tube and greater than the minimum potential required to sustain conduction of said glow-discharge tube; means including another source of fixed potential and an impedance means coupled in series across said glow-discharge tube; means including a transistor for reducing the magnitude of the current flowing through said glow-discharge tube to a value below that required to sustain conduction; said transistor having base, emitter, and collector electrodes; means coupling said glow-discharge tube between said collector and emitter electrodes; and means adapted for applying an input control voltage between said base and emitter electrodes for controlling the flow of current through said transistor.

13. A voltage indicating circuit comprising in combination, a transistor having first, second, and third electrodes, means including a glow-discharge tube coupled between said second and third electrodes, a load impedance means having a first terminal coupled to said second electrode and having a second terminal for receiving a direct potential relative to said third electrode, a clamping circuit including a uni-directional conductive device having a first terminal coupled to said second electrode and having a second terminal adapted for receiving another direct potential relative to said third electrode, and means adapted for coupling an input control voltage between said first and second electrodes, said glow-discharge tube being normally conducting in the absence of an input control voltage and being extinguished when the magnitude of said input control voltage exceeds a predetermined value.

References Cited in the file of this patent
UNITED STATES PATENTS
2,772,410  Logue _____ Nov. 27, 1956